(12) United States Patent
Saito

(10) Patent No.: US 10,411,979 B2
(45) Date of Patent: Sep. 10, 2019

(54) CONTROL INFORMATION MANAGEMENT APPARATUS, CONTROL INFORMATION PRESENTATION METHOD, AND PROGRAM

(71) Applicant: NEC Corporation, Tokyo (JP)

(72) Inventor: Shuichi Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 191 days.

(21) Appl. No.: 14/759,213

(22) PCT Filed: Jan. 20, 2014

(86) PCT No.: PCT/JP2014/050911
§ 371 (c)(1),
(2) Date: Jul. 3, 2015

(87) PCT Pub. No.: WO2014/112614
PCT Pub. Date: Jul. 24, 2014

(65) Prior Publication Data
US 2015/0358223 A1    Dec. 10, 2015

(30) Foreign Application Priority Data
Jan. 21, 2013 (JP) ................................ 2013-008133

(51) Int. Cl.
*H04L 12/26* (2006.01)
*G06F 16/951* (2019.01)
(Continued)

(52) U.S. Cl.
CPC ........ *H04L 43/0811* (2013.01); *G06F 16/951* (2019.01); *H04L 41/00* (2013.01); *H04L 49/25* (2013.01)

(58) Field of Classification Search
CPC ........................... H04L 41/00; G06F 17/30864
See application file for complete search history.

(56) References Cited

U.S. PATENT DOCUMENTS 7,620,713 B2    11/2009 Tokuhashi et al.
9,225,641 B2 *  12/2015 Kaneriya ............. H04L 45/745
(Continued)

FOREIGN PATENT DOCUMENTS

JP       2008-288848 A       11/2008
JP   WO 2012077262 A1 *   6/2012 ........... G06F 11/2028
(Continued)

OTHER PUBLICATIONS

Extended European Search Report dated Jul. 20, 2016.
(Continued)

*Primary Examiner* — Shripal K Khajuria
(74) *Attorney, Agent, or Firm* — McGinn I. P. Law Group, PLLC.

(57) ABSTRACT

A control information management apparatus, includes: a control information storage unit that stores a path(s) in association with an item(s) of control information that is set in a switch(es) by a control apparatus for controlling the switch(es) in a centralized manner; a search condition reception unit that receives information about a path associated with the item(s) of control information as a search condition for the item(s) of control information; a control information search unit that searches the control information storage unit for the item(s) of control information associated with the path that matches the search condition; and a search result output unit that outputs the item(s) of control information searched by the control information search unit.

21 Claims, 14 Drawing Sheets

(51) Int. Cl.
    *H04L 12/24*    (2006.01)
    *H04L 12/947*    (2013.01)

(56) References Cited

U.S. PATENT DOCUMENTS

| | | | |
|---|---|---|---|
| 2008/0285563 | A1 | 11/2008 | Ogishi |
| 2011/0261723 | A1 | 10/2011 | Yamato et al. |
| 2011/0305167 | A1 | 12/2011 | Koide |
| 2013/0176889 | A1 | 7/2013 | Ogawa |
| 2013/0201821 | A1 | 8/2013 | Yamato et al. |
| 2013/0250797 | A1* | 9/2013 | Itoh .............. H04L 12/56 370/252 |
| 2013/0268801 | A1 | 10/2013 | Yamato |

FOREIGN PATENT DOCUMENTS

| | | |
|---|---|---|
| RU | 2 115 162 C1 | 7/1998 |
| WO | WO 2012/049807 A1 | 4/2012 |
| WO | WO 2012/066830 A1 | 5/2012 |
| WO | WO 2012/077262 A1 | 6/2012 |
| WO | WO 2012/081202 A1 | 6/2012 |

OTHER PUBLICATIONS

Rob Sherwood, et al.: "FlowVisor: A Network Virtualization Layer FlowVisor: A Network Virtualization Layer", Oct. 14, 2009 (Oct. 14, 2009), XP055091501, Retrieved from the Internet: URL:http://openflow.orgfdownloads/technicalreports/openflow-tr-2009-1-flowvisor.pdf.

International Search Report (ISR) (PCT Form PCT/ISA/210), in PCT/JP2014/050911, dated Apr. 8, 2014.

Nick McKeown, and seven others, "OpenFlow: Enabling Innovation in Campus Networks," [online], [searched on Dec. 26, 2012], Internet <URL: http://www.openflow.org/documents/openflow-wp-latest.pdf>.

"OpenFlow Switch Specification" Version 1.0.0 (Wire Protocol 0x01), [online], [searched on Dec. 26, 2012], Internet <URL:https://www.opennetworking.org/images/stories/downloads/specification/openflow-spec-v1.0.0.pdf>.

Russian Office Action dated Nov. 24, 2016 with an English translation thereof.

\* cited by examiner

FIG. 6

| PATH | SWITCH , CONTROL INFORMATION |
|---|---|
| TERMINAL A →TERMINAL B | SWITCH A , MATCH CONDITIONS , ACTION<br>SWITCH D , MATCH CONDITIONS , ACTION |
| TERMINAL A →TERMINAL C | SWITCH A , MATCH CONDITIONS , ACTION<br>SWITCH B , MATCH CONDITIONS , ACTION<br>SWITCH C , MATCH CONDITIONS , ACTION<br>SWITCH D , MATCH CONDITIONS , ACTION |
| .. | .. |

FIG. 9

| SEARCH CONDITION | SWITCH, CONTROL INFORMATION |
|---|---|
| TERMINAL A → TERMINAL B | SWITCH A, MATCH CONDITIONS (SA = TERMINAL A, DA = TERMINAL B), ACTION (FORWARDING TO SWITCH D) SWITCH D, MATCH CONDITIONS (SA = TERMINAL A, DA = TERMINAL B), ACTION (FORWARDING TO TERMINAL B) |

FIG. 10

| SEARCH CONDITION | SWITCH, CONTROL INFORMATION |
|---|---|
| TERMINAL A → TERMINAL C | SWITCH A, MATCH CONDITIONS (SA = TERMINAL A, DA = TERMINAL C), ACTION (FORWARDING TO SWITCH B)<br>SWITCH B, MATCH CONDITIONS (SA = TERMINAL A, DA = TERMINAL C), ACTION (FORWARDING TO SWITCH C)<br>SWITCH C, MATCH CONDITIONS (SA = TERMINAL A, DA = TERMINAL C), ACTION (FORWARDING TO SWITCH D)<br>SWITCH D, MATCH CONDITIONS (SA = TERMINAL A, DA = TERMINAL C), ACTION (FORWARDING TO TERMINAL C) |

FIG. 12

| SEARCH CONDITION | SWITCH, CONTROL INFORMATION |
|---|---|
| TERMINAL A → TERMINAL C VLAN=10 | SWITCH A, MATCH CONDITIONS (SA = TERMINAL A, DA = TERMINAL C), ACTION (FORWARDING TO SWITCH B) SWITCH B, MATCH CONDITIONS (SA = TERMINAL A, DA = TERMINAL C), ACTION (FORWARDING TO SWITCH C) SWITCH C, MATCH CONDITIONS (SA = TERMINAL A, DA = TERMINAL C), ACTION (FORWARDING TO SWITCH D) SWITCH C, MATCH CONDITIONS (SA = TERMINAL A, DA = TERMINAL C), ACTIONS (FORWARDING TO TERMINAL C AFTER REWRITING VLAN) |

# CONTROL INFORMATION MANAGEMENT APPARATUS, CONTROL INFORMATION PRESENTATION METHOD, AND PROGRAM

REFERENCE TO RELATED APPLICATION

The present invention is based upon and claims the benefit of the priority of Japanese patent application No. 2013-008133, filed on Jan. 21, 2013, the disclosure of which is incorporated herein in its entirety by reference thereto.

TECHNICAL FIELD

The present invention relates to a control information management apparatus, a control information presentation method, and a program. In particular, it relates to: a control information management apparatus that manages control information in a centralized-control-type network; a control information presentation method; and a program.

BACKGROUND

In Non-Patent Literatures 1 and 2, a technique referred to as OpenFlow has been proposed. OpenFlow recognizes communications as end-to-end flows and performs path control, failure recovery, load balancing, and optimization on a per-flow basis. Each OpenFlow switch according to Non-Patent Literature 2 has a secure channel for communication with an OpenFlow controller and operates according to a flow table suitably added or rewritten by the OpenFlow controller. In the flow table, a set of the following three is defined for each flow: Match conditions (Match Fields) against which a packet header is matched; Flow statistical information (Counters); and Actions that define at least one processing content (see section "3 Flow Table" in Non-Patent Literature 2).

For example, when an OpenFlow switch receives a packet, the OpenFlow switch searches the flow table for an entry having a match condition that matches header information of the received packet (see "3.4 "Matching" in Non-Patent Literature 2). If, as a result of the search, the OpenFlow switch finds an entry that matches the received packet, the OpenFlow switch updates the flow statistical information (Counters) and processes the received packet on the basis of a processing content(s) (packet transmission from a specified port, flooding, dropping, etc.) written in the Actions field of the entry. If, as a result of the search, the OpenFlow switch does not find an entry that matches the received packet, the OpenFlow switch transmits an entry setting request to the OpenFlow controller via the secure channel. Namely, the OpenFlow switch requests the OpenFlow controller to transmit control information for processing the received packet (Packet-In message). The OpenFlow switch receives a flow entry from the OpenFlow controller and updates the flow table. In this way, by using an entry stored in the flow table as control information, the OpenFlow switch performs packet forwarding.

Patent Literature 1 discloses a path information management apparatus used for an autonomous-distributed-type network such as a TCP/IP (Transmission Control Protocol/Internet Protocol) network. More specifically, the path information management apparatus includes a path information reception unit for receiving path information representing change of a communication path and path information indicating cancellation of a communication path from a communication path observation apparatus. In addition, the path information management apparatus includes a path state table creation unit for creating a path state table in which a path presence period on the basis of the reception time of path information and a range of an address space represented by values obtained from prefixes included in the path information are stored for each communication path. The path state table creation unit stores these path state tables in a path information database.

Patent Literature 1: Japanese Patent Kokai Publication No. 2008-288848A
Non-Patent Literature 1: Nick. McKeown, and seven others, "OpenFlow: Enabling Innovation in Campus Networks," [online], [searched on Dec. 26, 2012].
Non-Patent Literature 2: "OpenFlow Switch Specification" Version 1.0.0 (Wire Protocol 0x01), [online], [searched on Dec. 26, 2012].

SUMMARY

The following analysis has been given by the present inventor. In the above centralized-control-type network, for example, when a failure occurs in a secure channel between the control apparatus and a switch, appropriate control information cannot be set in the switch. As a result, a communication failure could occur. If such a communication failure occurs, an operator need to check each item of control information stored in the control apparatus and the switches, determine a target communication path, and determine whether the control information set in the switches on the path are valid. However, since a large number of items of control information are stored in each switch, it takes a long time to determine the location of the cause. Namely, there is a problem that it takes a long time to determine and recover from the failure.

The path information management apparatus in Patent Literature 1 is an apparatus for managing paths in an autonomous-distributed-type network. This control apparatus receives path information (BGP path information) exchanged per organization referred to as an autonomous system from the communication path observation apparatus, creates a path state table, and stores the created path state table in the path information database. Patent Literature 1 cannot be applied, for example, to determination of the location of the cause of a communication failure in the above centralized-control-type network.

An object of the present invention is to provide a control information management apparatus, a control information presentation method, and a program that contribute to facilitating checking of control information set by a control apparatus in the above centralized-control-type network.

Solution to Problem

According to a first aspect, there is provided a control information management apparatus, comprising: a control information storage unit that stores a path(s) in association with an item(s) of control information that is set in a switch(es) by a control apparatus for controlling the switch(es) in a centralized manner; a search condition reception unit that receives information about a path associated with the item(s) of control information as a search condition for the item(s) of control information; a control information search unit that searches the control information storage unit for the item(s) of control information associated with the path that matches the search condition; and a search result output unit that outputs the item(s) of control information searched by the control information search unit.

According to a second aspect, there is provided a control information presentation method, comprising: by a control information management apparatus that includes a control information storage unit storing a path(s) in association with an item(s) of control information that is set in a switch(es) by a control apparatus for controlling the switch(es) in a centralized manner: receiving information about a path associated with the item(s) of control information as a search condition for the item(s) of control information; searching the control information storage unit for the item(s) of control information associated with the path that matches the search condition; and outputting the searched item(s) of control information. This method is associated with a certain machine, that is, a control information management apparatus that manages control information set in each switch in a centralized-control-type network.

According to a third aspect, there is provided a program, causing a computer, including a control information storage unit that stores a path(s) in association with an item(s) of control information that is set in a switch(es) by a control apparatus for controlling the switch(es) in a centralized manner, to execute: receiving information about a path associated the item(s) of control information as a search condition for the item(s) of control information; searching the control information storage unit for the item(s) of control information associated with the path that matches the search condition; and outputting the searched item(s) of control information. This program can be recorded in a computer-readable (non-transient) storage medium. Namely, the present invention can be embodied as a computer program product.

The present invention provides the following advantage, but not restricted thereto. The present invention can contribute to facilitating checking of control information set by a control apparatus in a centralized-control-type network.

BRIEF DESCRIPTION OF THE DRAWINGS

FIG. 6 illustrates entries stored in a control information storage unit in the control apparatus according to the first exemplary embodiment of the present invention.

FIG. 9 illustrates an exemplary search result obtained by the control apparatus according to the first exemplary embodiment of the present invention.

FIG. 10 illustrates another exemplary search result obtained by the control apparatus according to the first exemplary embodiment of the present invention.

FIG. 12 illustrates another exemplary search result obtained by the control apparatus according to the first exemplary embodiment of the present invention.

PREFERRED MODES

Figure 1:
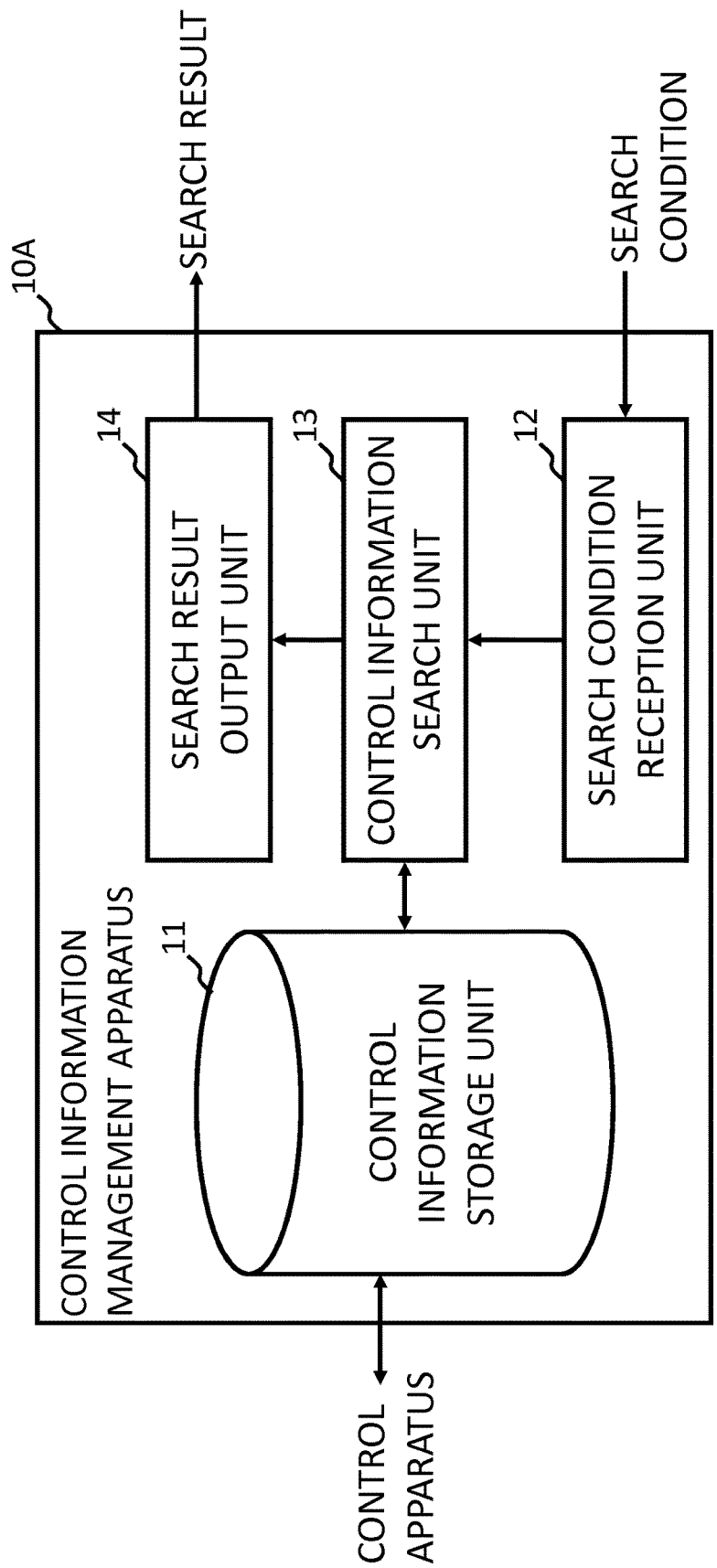
FIG. 1 illustrates a configuration according to an exemplary embodiment of the present invention.

In the present disclosure, there are various possible modes, which include the following, but not restricted thereto. First, an outline of an exemplary embodiment of the present invention will be described with reference to a drawing. In the following outline, various components are denoted by reference characters for the sake of convenience. Namely, the following reference characters are merely used as examples to facilitate understanding of the present invention, not to limit the present invention to the illustrated modes.

As illustrated in FIG. 1, an exemplary embodiment of the present invention can be realized by a control information management apparatus 10A including: a control information storage unit 11 configured to store items of control information set by a control apparatus that controls switches in a centralized manner in the switches; a search condition reception unit 12; a control information search unit 13; and a search result output unit 14.

More specifically, the control information storage unit 11 stores paths and items of control information set by the control apparatus in the switches, each of the items of control information being associated with one of the paths. The search condition reception unit 12 receives information about a path associated with one of the items of control information as a search condition for the item of control information. The control information search unit 13 searches the control information storage unit 11 for the item of control information associated with the path that matches the search condition. The search result output unit 14 outputs the item of control information searched by the control information search unit 13.

The control information management apparatus 10A can be configured as a server that stores control information set by the control apparatus in the switches for a predetermined period and that provides the control apparatus with created control information or as a backup server that backs up the control information. Alternatively, the control information management apparatus 10A can be integrated with the control apparatus as will be described in the following exemplary embodiments.

Figure 8:
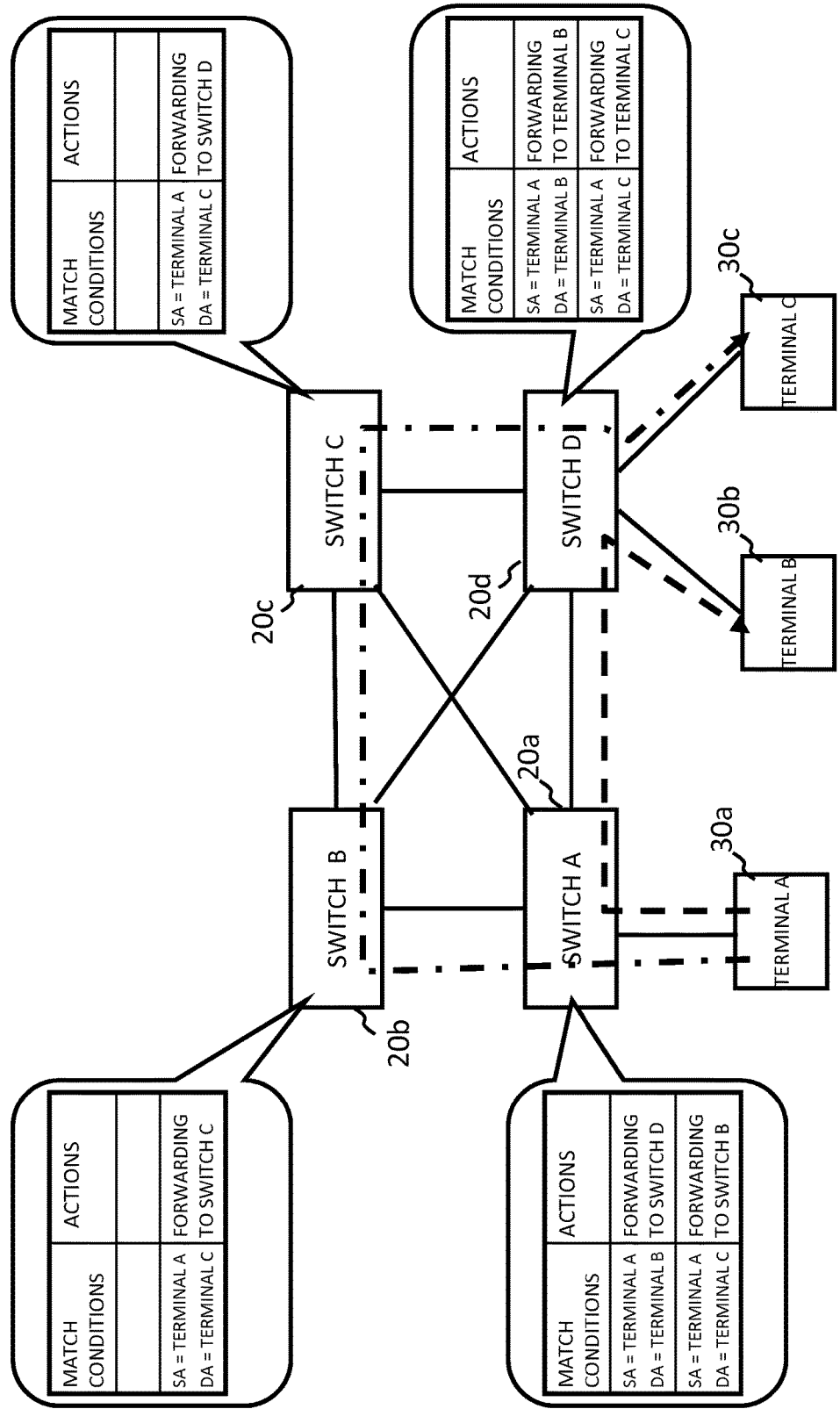
FIG. 8 illustrates an operation of the control apparatus according to the first exemplary embodiment of the present invention.

For example, as illustrated in FIGS. 9 and 10, the search result output unit 14 may output the control information itself associated with a path set as a search condition. Alternatively or additionally, as illustrated in FIG. 8, a graph or the like indicating a connection relationship among the switches may be displayed, and the search result output unit 14 may output a result after receiving an operation visually. For example, when a user selects switches in FIG. 8 with a cursor or the like and performs a predetermined operation of requesting display of control information, balloons or popup windows each displaying control information may be displayed as illustrated in FIG. 8.

First Exemplary Embodiment

Figure 2:
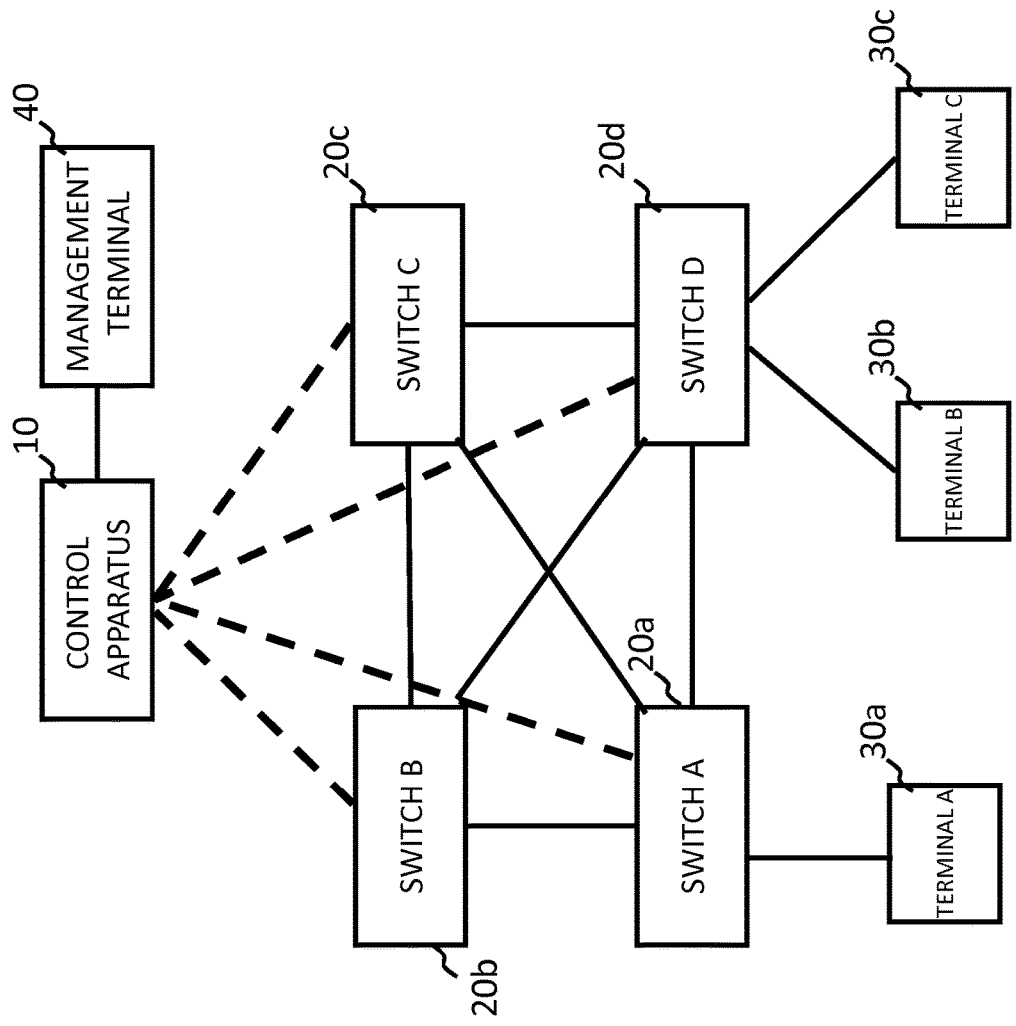
FIG. 2 illustrates a configuration of a communication system according to a first exemplary embodiment of the present invention.

Next, a first exemplary embodiment of the present invention will be described in detail with reference to the drawings. FIG. 2 illustrates a configuration of a communication system according to a first exemplary embodiment of the present invention. FIG. 2 illustrates a communication system including a control apparatus 10 and a plurality of switches 20a to 20d.

The control apparatus 10 controls the switches 20a to 20d by transmitting control information to the switches 20a to 20d via secure channels indicated by dashed lines in FIG. 2, respectively.

Each of the switches 20a to 20d stores control information received from the control apparatus 10. When any one of the switches 20a to 20d receives a packet, this switch searches its own control information for control information having a match condition(s) that matches the received packet and processes the packet on the basis of the processing content (packet forwarding, header rewriting, dropping, etc.) written in the control information. As such switches 20a to 20d, OpenFlow switches in Non-Patent Literatures 1 and 2 can be used. In the example in FIG. 2, each of the switches 20a to 20d is connected to the other switches. However, the connection mode is not limited to the example in FIG. 2.

In addition, the present exemplary embodiment will be described assuming that a terminal 30a is connected to the switch 20a and terminals 30b and 30c are connected to the switch 20d, as illustrated in FIG. 2.

In addition, the present exemplary embodiment will be described assuming that a management terminal 40 is connected to the control apparatus 10, as illustrated in FIG. 2.

Figure 3:
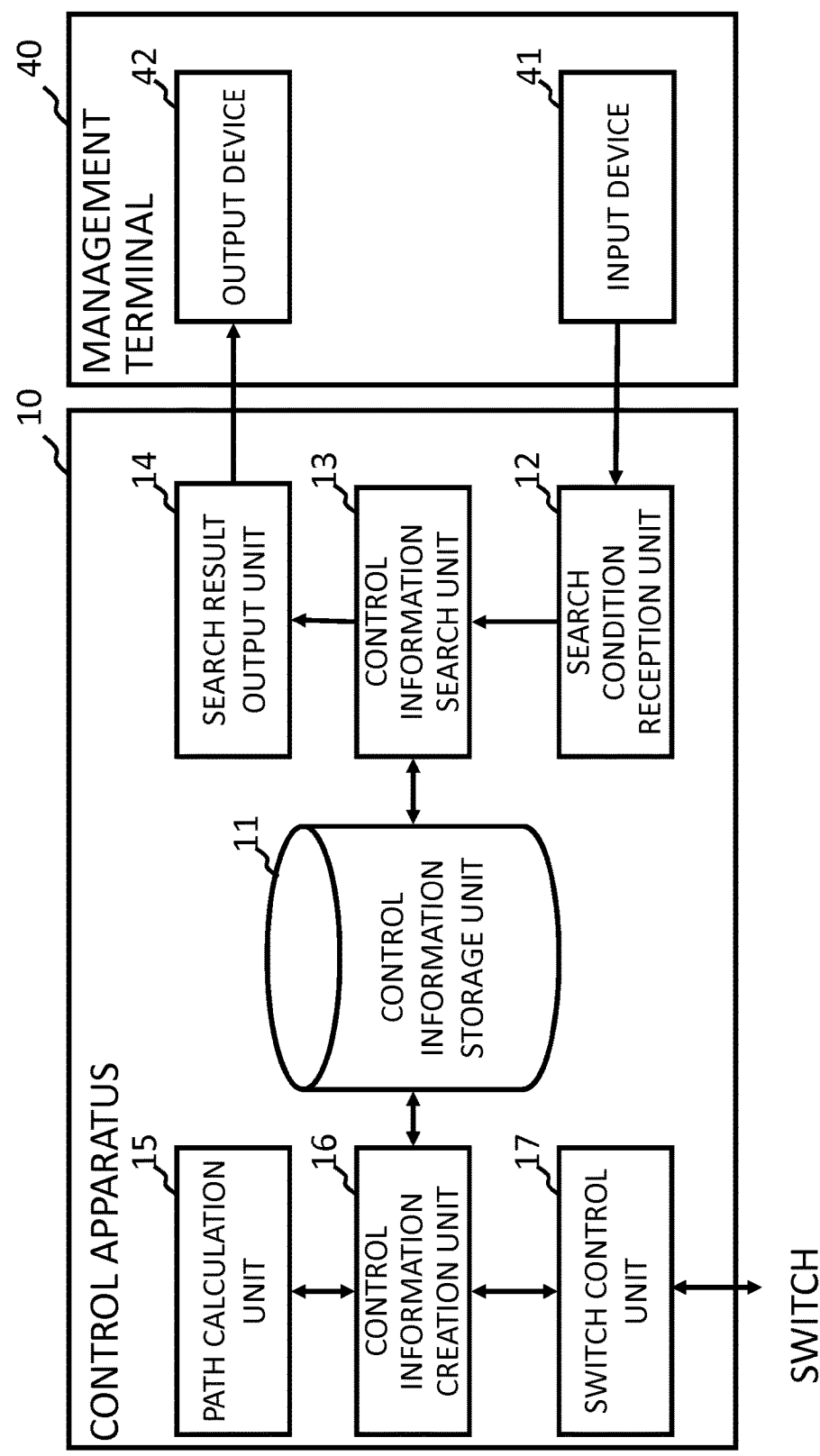
FIG. 3 is a block diagram illustrating a detailed configuration of a control apparatus according to the first exemplary embodiment of the present invention.

FIG. 3 is a block diagram illustrating a detailed configuration of the control apparatus 10 and of the management terminal 40 according to the first exemplary embodiment of the present invention. As illustrated in FIG. 3, the control apparatus 10 includes a control information storage unit 11, a search condition reception unit 12, a control information search unit 13, a search result output unit 14, a path calculation unit 15, a control information creation unit 16, and a switch control unit 17.

The management terminal 40 includes an input device 41 including a keyboard, a pointing device, a touchpad, or the like and an output device 42 including a display device, a printer, or the like.

For example, the control information storage unit 11 in the control apparatus 10 is formed by a database storing the control information that is created by the control information creation unit 16 and stored in the switches 20a to 20d.

The search condition reception unit 12 receives input of a control information search condition(s) from the input device 41 in the management terminal 40 and outputs the search condition(s) to the control information search unit 13. It is preferable that a user be allowed to specify, as a search condition, any combination of information about terminals serving as start and end points of a path, information used as a match condition in the control information, and IDs (DPIDs) of switches on a path, for example.

The control information search unit 13 uses the control information search condition(s) to search for control information stored in the control information storage unit 11 and outputs the result to the search result output unit 14.

The search result output unit 14 transmits the control information search result received from the control information search unit 13 to the management terminal 40.

In response to a request from the control information creation unit 16, the path calculation unit 15 calculates a packet forwarding path in the network formed by the switches 20a to 20d.

When receiving a control information creation request from the switch control unit 17, the control information creation unit 16 requests the path calculation unit 15 to calculate a forwarding path for the packet specified in the control information creation request. When receiving a path calculation result from the path calculation unit 15, the control information creation unit 16 creates control information for causing, among the switches 20a to 20d, a relevant switch(es) on the path to forward the packet on the path. The control information creation unit 16 can create not only the control information for causing the switch(es) to forward the packet but also control information for causing the switch(es) to perform another process (action) such as dropping, copying, or rewriting the packet. For example, on the basis of a predetermined access policy or the like, the control information creation unit 16 may create control information in which an action for dropping a certain packet is set or create control information in which an action for rewriting the VLAN ID in a corresponding packet header is set.

When receiving a control information transmission request from any one of the switches 20a to 20d, the switch control unit 17 requests the control information creation unit 16 to create control information for processing the packet specified in the control information transmission request. When receiving control information from the control information creation unit 16, the switch control unit 17 transmits the control information to the switches 20a to 20d.

The control apparatus 10 as described above can be realized by adding the control information storage unit 11, the search condition reception unit 12, the control information search unit 13, and the search result output unit 14 to the OpenFlow controller in Non-Patent Literatures 1 and 2.

Figure 4:
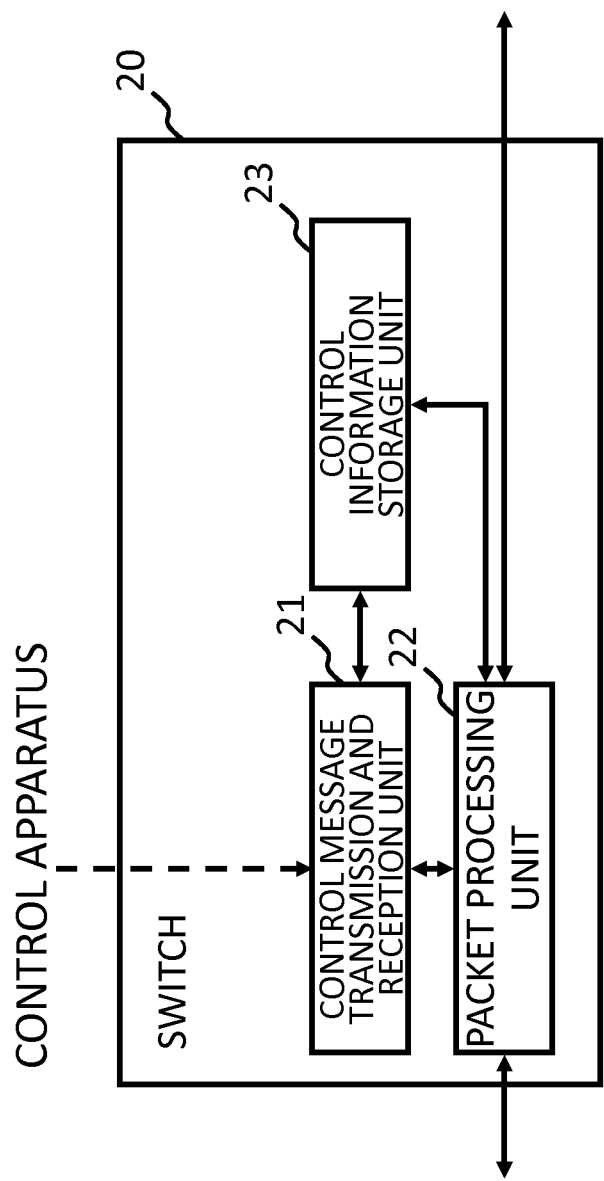
FIG. 4 is a block diagram illustrating a detailed configuration of a switch according to the first exemplary embodiment of the present invention.

FIG. 4 is a block diagram illustrating a detailed configuration of a switch 20 (hereinafter, any one of the switches 20a to 20d will be referred to as a "switch 20" unless the switches 20a to 20d need to be particularly distinguished from each other). As illustrated in FIG. 4, the switch 20 includes: a control message transmission and reception unit 21 that, for example, transmits a control information transmission request to the control apparatus 10 and receives control information from the control apparatus 10; a control information storage unit 23 that stores control information received from the control apparatus 10; and a packet processing unit 22 that searches the control information stored in the control information storage unit 23 for control information having a match condition(s) that matches a received packet and processes the packet. If, as a result of the search, the packet processing unit 22 does not find control information having a match condition(s) that matches a received packet, the packet processing unit 22 requests the control message transmission and reception unit 21 to transmit a control information transmission request to the control apparatus 10.

Figure 5:
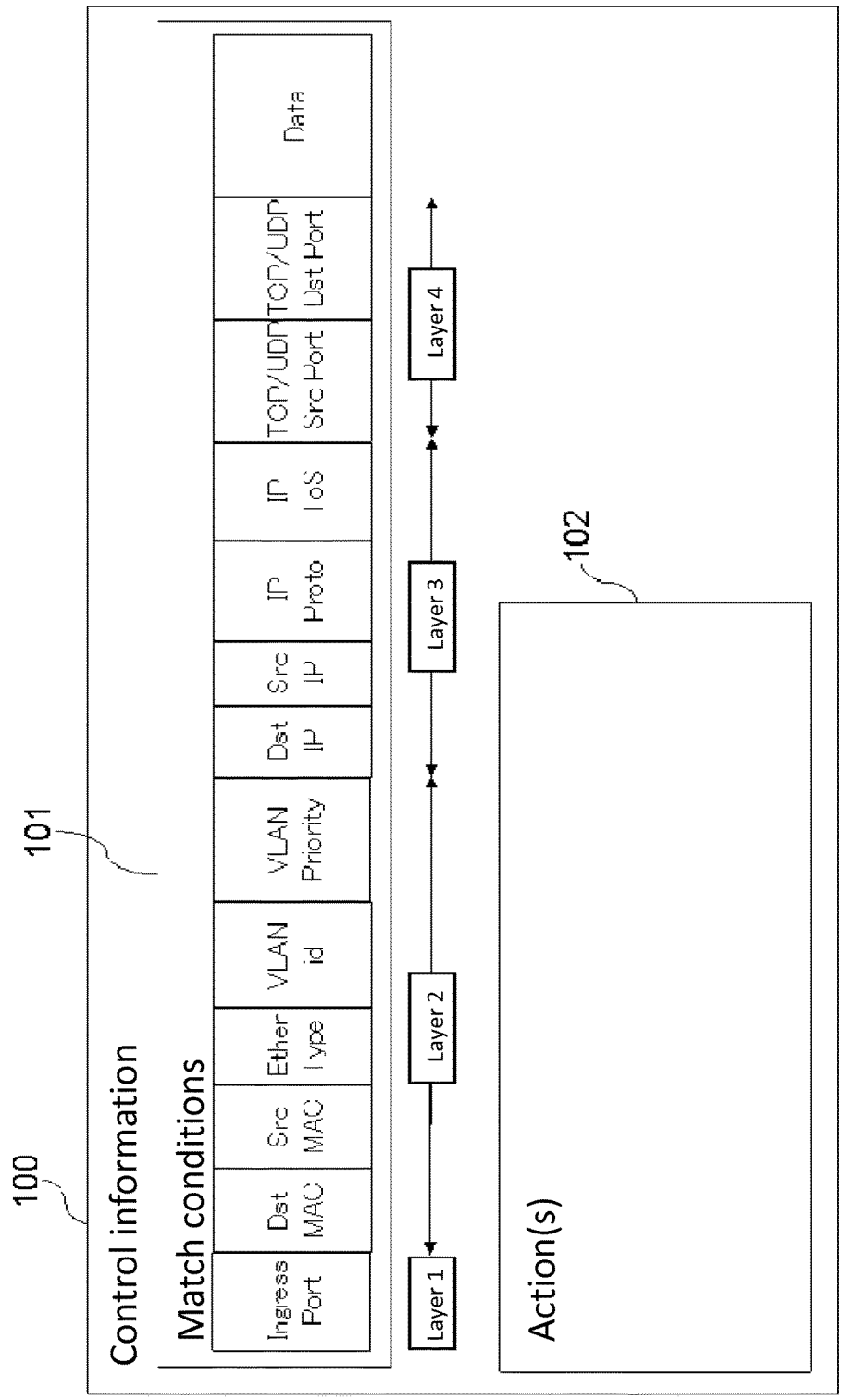
FIG. 5 illustrates a configuration of control information set by the control apparatus according to the first exemplary embodiment of the present invention in a switch.

Next, control information stored in the control information storage unit 23 of a switch 20 will be described. FIG. 5 illustrates an exemplary configuration of control information set in the control information storage unit 23 in a switch 20 by the control apparatus 10. As illustrated in FIG. 5, in the control information, match conditions 101 and an action(s)

102 are associated with each other. As illustrated in FIG. 5, match conditions 101 are formed by an arbitrary combination of fields for layers 1 to 4. A wildcard can be set as each item of information. The action(s) 102 indicates a processing content(s) applied to packets that match the match conditions 101.

While the match conditions in FIG. 5 are based on the flow entry specification in Non-Patent Literature 2, the match conditions of the present invention are not limited to such match conditions. For example, an MPLS (Multi-Protocol Label Switching) label, IPv6 header, or the like added in any one of the specifications after Non-Patent Literature 2 may be added as a match condition. In addition, as disclosed in Non-Patent Literature 2, each item of control information may be provided with a flow statistical information field (Counters).

All the control information stored in the switches 20a to 20d is stored in the control information storage unit 11 in the control apparatus 10, and each item of control information is associated with a path. FIG. 6 illustrates entries stored in the control information storage unit 11 in the control apparatus 10. In each of the entries in FIG. 6, a path calculated by the path calculation unit 15, information (DPIDs, for example) about switches as control information setting targets, and control information transmitted to each of the switches are associated with each other.

For example, assuming that the path calculation unit 15 has calculated a packet forwarding path, which goes through the terminal A, the switch A, the switch D, and the terminal B in this order, as a forwarding path for a packet addressed to the terminal B transmitted from the terminal A in FIG. 2, the control apparatus 10 sets control information, in which a match condition(s) for determining packets addressed to the terminal B from the terminal A and an action for forwarding these packets to the switch D are associated with each other, in the switch A. Likewise, the control apparatus 10 sets control information, in which a match condition(s) for determining packets addressed to the terminal B from the terminal A and an action for forwarding these packets to the switch B are associated with each other, in the switch D. Next, these items of control information are associated with the corresponding path, and the information is stored in the control information storage unit 11 in the control apparatus 10 (see the first entry in FIG. 6). The second entry in FIG. 6 illustrates control information about a calculated path for forwarding packets addressed from the terminal A to the terminal C. In accordance with this path, the packets are forwarded from the terminal A to the terminal C via the switches A, B, C, and D in this order.

In the example in FIG. 6, in addition to information about the packet source and destination terminals, the information about the switches on the path and the match conditions (information about layers 1 to 4) are included. Thus, control information can be found by combining these items of information. More preferably, in addition to the information in FIG. 6, for example, information about the switch port to which the packet source terminal is connected, information about the switch port to which the packet destination terminal is connected, and a path creation date may be associated with each other in the control information. In this way, in addition to the information about the packet source and destination terminals, the port information about the entry- and exit-side switches and the path (control information) creation date can also be used as the search conditions.

An identifier for identifying an item of control information may be generated and stored in the control apparatus 10 and the switches 20. In this way, the control information set in the switches 20 can be identified more easily.

Each unit (processing means) of the control apparatus 10 illustrated in FIG. 3 may be realized by a computer program which causes a computer that constitutes the control apparatus 10 to use its hardware and execute the corresponding processing described above. In addition, in the example in FIG. 3, the control apparatus 10 includes the control information storage unit 11, the search condition reception unit 12, the control information search unit 13, and the search result output unit 14. However, as illustrated in FIG. 1, it is possible to adopt the configuration in which the control information management apparatus 10A including the control information storage unit 11, the search condition reception unit 12, the control information search unit 13, and the search result output unit 14 is connected to the control apparatus.

Figure 7:
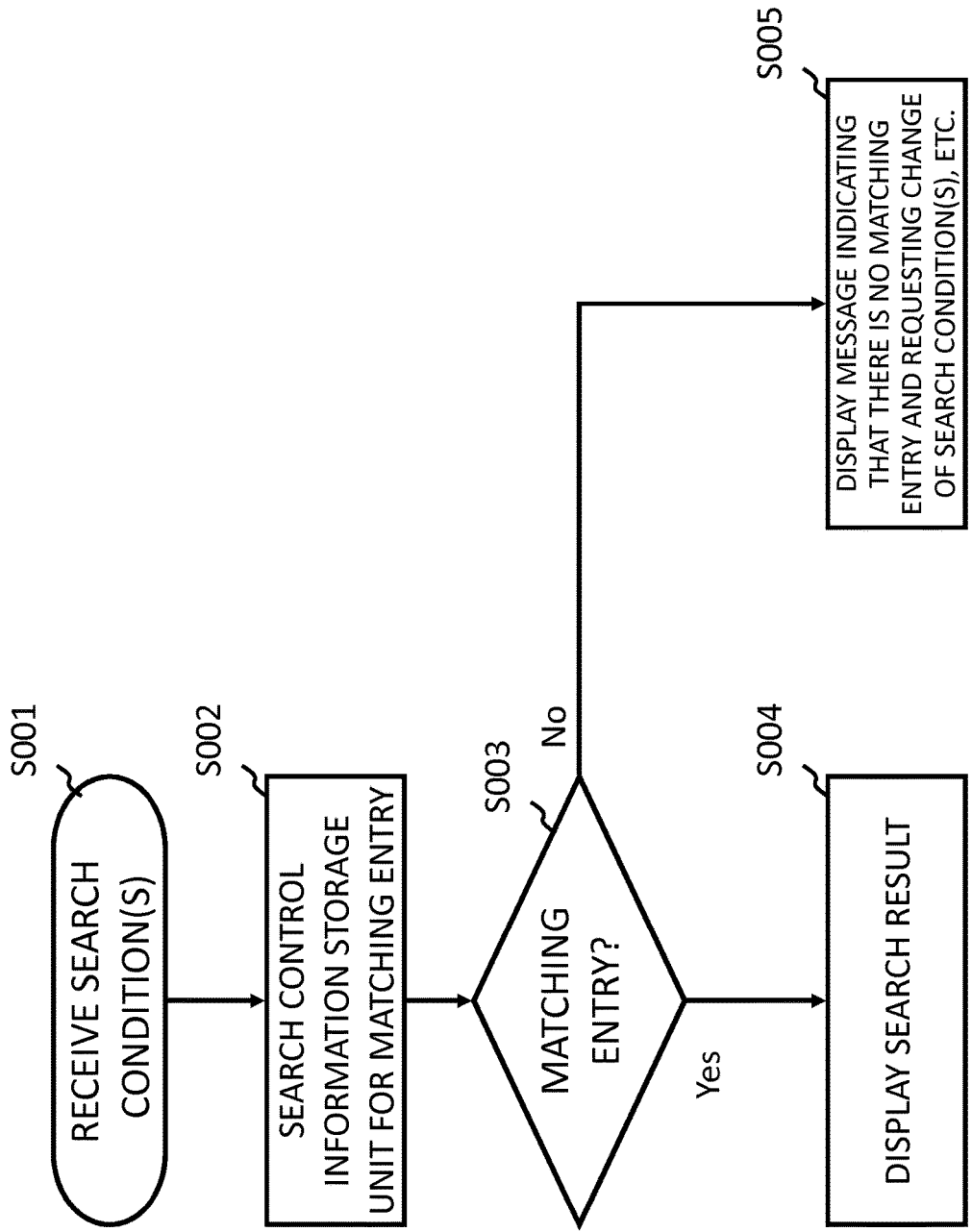
FIG. 7 is a flowchart illustrating an operation of the control apparatus according to the first exemplary embodiment of the present invention.

Next, an operation according to the present exemplary embodiment will be described in detail with reference to the drawings. FIG. 7 is a flowchart illustrating an operation of the control apparatus according to the first exemplary embodiment of the present invention. As illustrated in FIG. 7, the search condition reception unit 12 in the control apparatus 10 receives input of a control information search condition(s) from a user via the input device 41 of the management terminal 40 (step S001).

Next, by using the inputted search condition(s), the control information search unit 13 in the control apparatus 10 searches the control information stored in the control information storage unit 11 (step S002).

If, as a result of the search, the control information search unit 13 finds an entry that matches the search condition(s) (Yes in step S003), the search result output unit 14 in the control apparatus 10 transmits a control information search result transmitted from the control information search unit 13 to the management terminal 40. The management terminal 40 causes the output device 42 to display the search result, for example (step S004).

If, as a result of the search, the control information search unit 13 does not find an entry that matches the search condition(s) (No in step S003), the search result output unit 14 in the control apparatus 10 transmits a search result indicating that there is no matching entry to the management terminal 40. The management terminal 40 causes the output device 42 to display a message indicating that there is no control information that matches the specified search condition(s) and requesting change of the search condition(s), for example (step S005).

Next, the operation according to the present exemplary embodiment will be described in more detail by using specific examples. FIG. 8 illustrates a calculated path between the terminals A and B in FIG. 2 (a dashed line in FIG. 8) and a calculated path between the terminals A and C (a dashed-dotted line in FIG. 8). FIG. 8 also illustrates control information set in the switches 20a to 20d. "SA" and "DA" as match conditions in the control information (balloons) set in the switches 20a to 20d in FIG. 8 represent the source and destination addresses in a packet header, respectively.

The following description will be made assuming that a failure has been detected in the communication from the terminal A to the terminal B and the user has transmitted a control information search request by inputting a search condition indicating the communication from the terminal A to the terminal B to the control apparatus 10 via the management terminal 40.

When receiving the request, the control apparatus 10 searches the control information stored in the control information storage unit 11 by using the inputted search condition. The control apparatus 10 searches the exemplary entries illustrated in FIG. 6 for an entry that matches the search condition indicating the communication from the terminal A to the terminal B and outputs a search result to the management terminal 40.

FIG. 9 illustrates information displayed as the search result when the search condition indicating the communication from the terminal A to the terminal B is inputted. Likewise, FIG. 10 illustrates information displayed as the search result when the search condition indicating the communication from the terminal A to the terminal C is inputted.

The user can see the search result as illustrated in FIG. 9 or 10 to check the packet forwarding path between the terminals and the contents of the control information set in the switches on the path. In addition, on the basis of the result, the user can check the status of a switch on the path to check whether necessary control information is appropriately set.

Figure 11:
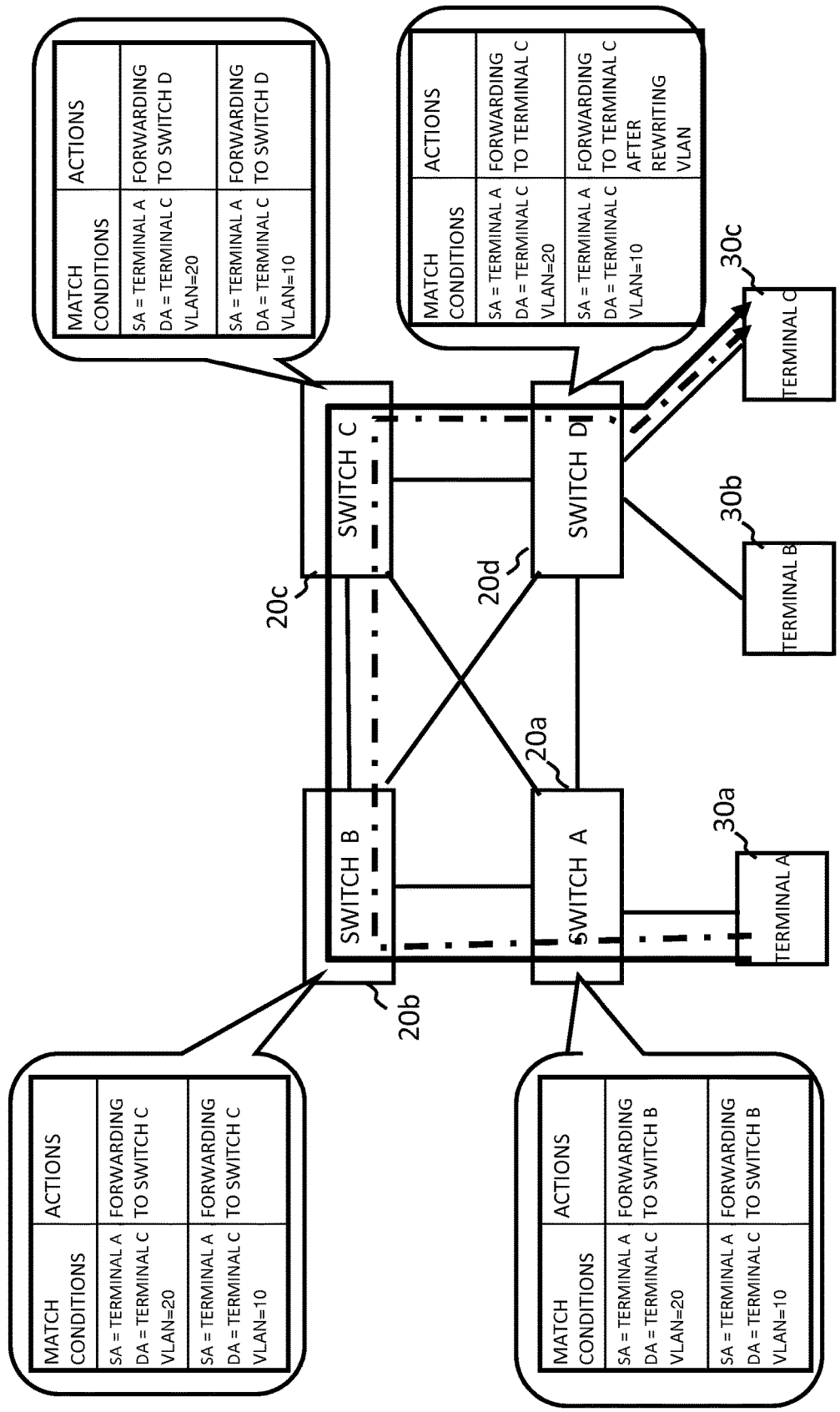
FIG. 11 illustrates another operation of the control apparatus according to the first exemplary embodiment of the present invention.

As a search condition, the user may specify not only such terminal information as described above but also information used as a control information match condition. FIG. 11 illustrates two calculated communication paths between the terminals A and C, each of the paths using a different VLAN ID (a solid line and a dashed-dotted line in FIG. 11). In FIG. 11, control information is set in the switches 20a to 20d.

Next, an example will be considered, in which a failure has been detected in the communication (VLAN ID=10) from the terminal A to the terminal C and the user has transmitted a control information search request to the control apparatus 10 via the management terminal 40 by inputting search conditions indicating the communication from the terminal A to the terminal C and VLAN ID=10.

When receiving the request, the control apparatus 10 searches the control information stored in the control information storage unit 11 by using the inputted search conditions. In this example, the control apparatus 10 searches the entries illustrated in the balloons in FIG. 11 for entries that match the search conditions indicating the communication from the terminal A to the terminal C and VLAN ID=10 and outputs a search result to the management terminal 40. FIG. 12 illustrates information displayed as the search result when the search conditions indicating the communication from the terminal A to the terminal C and VLAN ID=10 are inputted.

As described above, according to the present exemplary embodiment, even when a plurality of items of control information are set between certain terminals, by specifying a search condition(s) such as a match condition(s), it is possible to narrow the search to intended control information. Information other than the above VLAN ID information may be used as a search condition. For example, an item as a match condition in FIG. 5 or an item added in any one of the specifications after Non-Patent Literature 2 may be used.

While only the search result is displayed in the examples in FIGS. 9, 10, and 12, a GUI (Graphical User Interface) may be used to achieve a more user-friendly mode. For example, in one mode, by causing the management terminal 40 to display a screen indicating a connection relationship among the terminals and switches as illustrated in FIG. 2 and receive selection of start and end nodes via a cursor or the like, the user can specify a search condition(s). In addition, in one mode, after the search, the output device 42 may display a list of items of control information set in the switches on the path, as illustrated in FIGS. 8 and 11.

As described above, according to the present exemplary embodiment, by inputting a search condition(s) and specifying a path, corresponding control information can be displayed quickly. This is because the control information set in each of the switches is managed in association with information about the path.

In addition, according to the present exemplary embodiment, it is possible to reduce the time required for troubleshooting when a failure occurs. This is because, instead of individually examining the control information in the switches on a network, the control information can be displayed and checked on the control apparatus 10.

In addition, according to the present exemplary embodiment, since it is possible to specify a path in which a failure or the like has occurred and display and check only the control information in the relevant switches on the control apparatus 10, a control information validity check operation can be performed more quickly.

Second Exemplary Embodiment

Next, a second exemplary embodiment of the present invention will be described. In the second exemplary embodiment, a user can check whether a switch actually operates appropriately in accordance with control information set as described above. The present exemplary embodiment differs from the first exemplary embodiment only in that a function of transmitting a test packet (path check packet) is additionally included in the control apparatus 10. Thus, the following description will be made with a focus on the difference.

Figure 13:
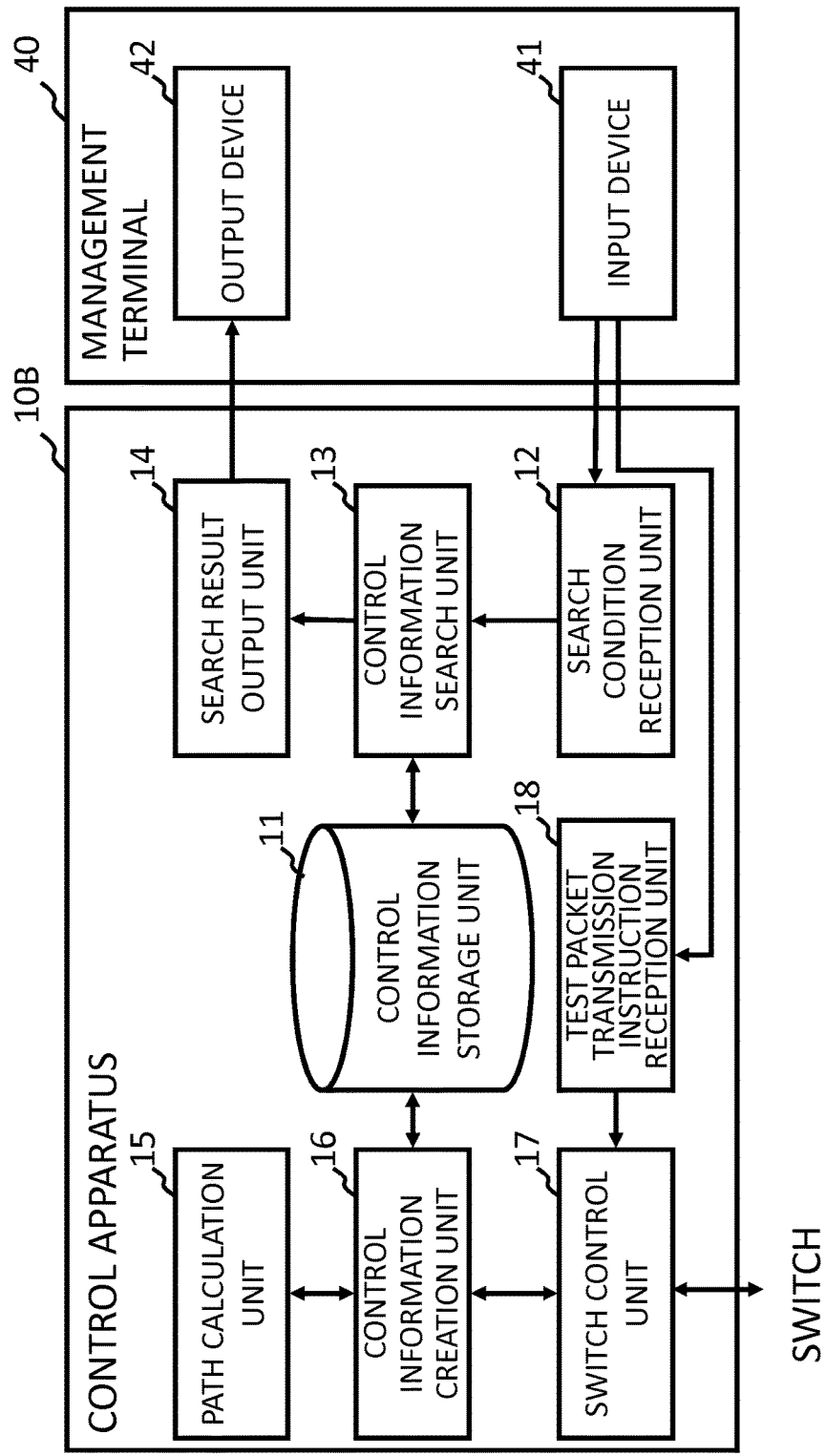
FIG. 13 is a block diagram illustrating a detailed configuration of a control apparatus according to a second exemplary embodiment of the present invention.

FIG. 13 is a block diagram illustrating a detailed configuration of a control apparatus 10B according to the second exemplary embodiment of the present invention. The control apparatus 10B differs from the control apparatus according to the first exemplary embodiment in FIG. 3 in that the control apparatus 10B includes a test packet transmission instruction reception unit 18.

When receiving a test packet transmission instruction from the input device 41 of the management terminal 40, the test packet transmission instruction reception unit 18 requests the switch control unit 17 to issue a test packet transmission instruction for a specified switch.

As the above test packet transmission instruction, a Packet-Out message used when the OpenFlow controller in Non-Patent Literature 2 instructs an OpenFlow switch to transmit a specified packet may be used.

Figure 14:
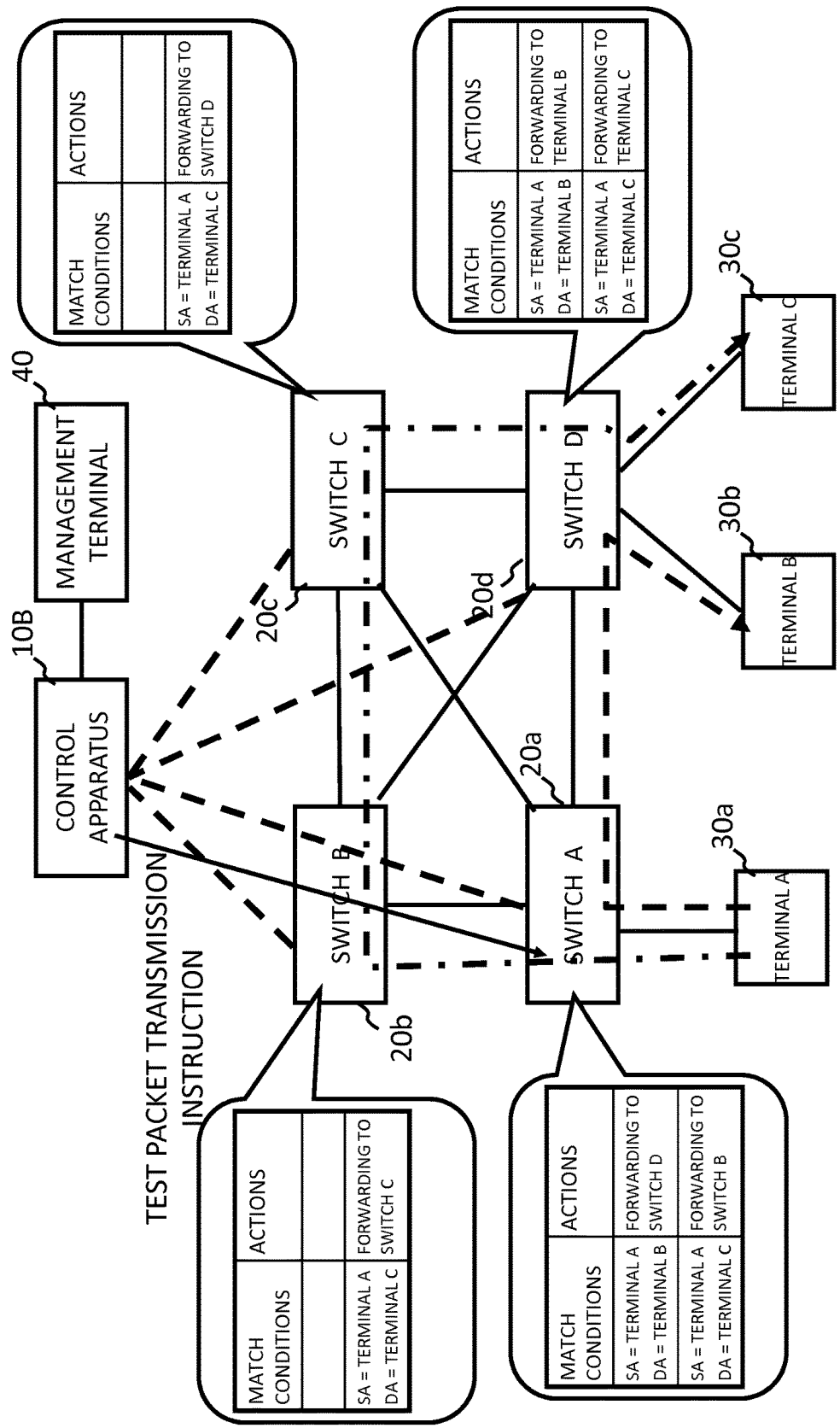
FIG. 14 illustrates an operation of the control apparatus according to the second exemplary embodiment of the present invention.

In addition, as the test packet, the user can use a packet having the same header as that of a packet with which the user wishes to check the operation of a target switch 20 in accordance with set control information. For example, in FIG. 14, the control apparatus 10B instructs the switch 20a to transmit a test packet indicating the terminal A as the source terminal and the terminal C as the destination terminal to the switch 20b. When receiving the test packet, the switch 20b searches the control information stored therein for control information having the match conditions indicating an address of the terminal A as the source terminal and an address of the terminal C as the destination terminal. In accordance with the control information found, the switch 20b forwards the test packet to the switch 20c. Likewise, the switches 20c and 20d search the respective control information stored therein for control information having the matching conditions indicating the address of the terminal A as the source terminal and the address of the terminal C as the destination terminal. In accordance with the control information found, the switches 20c and 20d forward the test packet on the path.

As described above, according to the present exemplary embodiment, the user can determine whether the switch 20 operates in accordance with checked control information. In particular, the present exemplary embodiment is effective when a failure occurs between certain switches 20 or when an apparatus (a layer 2 switch, for example) whose state cannot directly be recognized by the control apparatus 10B exists between certain switches.

As a mechanism of checking successful forwarding of the test packet, for example, control information for causing the switch 20d located at the end to notify the control apparatus 10B of reception of the test packet or control information for causing the switch 20d to rewrite the packet header may be set. In this way, reception of the test packet or rewriting of the packet header can be checked. If each of the switches 20a to 20d has a function of recording statistical information representing the number of times that an item of control information has hit, the switch 20 may be queried about the statistical information in such control information, for example (a statistical information acquisition message in Non-Patent Literature 2 may be used, for example).

While exemplary embodiments of the present invention have thus been described, the present invention is not limited thereto. Further variations, substitutions, or adjustments can be made without departing from the basic technical concept of the present invention. For example, the configurations of the networks and elements illustrated in the drawings are used only as examples to facilitate understanding of the present invention. Namely, the present invention is not limited to the configurations illustrated in the drawings.

Finally, suitable modes of the present invention will be summarized.

[Mode 1]
A control information management apparatus may be the control information management apparatus according to the above first aspect.

[Mode 2]
In the control information management apparatus according to the mode 1, the control information storage unit may store information about a terminal corresponding to a start point or an end point of the path in association with the item(s) of control information. The item of control information may be searched by specifying as the search condition the terminal corresponding to the start point or the end point of the path.

[Mode 3]
In the control information management apparatus according to the mode 1 or 2, information used as a match condition in the control information set in the switch(es) may be specified as the search condition.

[Mode 4]
In the control information management apparatus according to any one of the modes 1 to 3, the control information management apparatus may be configured to: instruct the control apparatus to transmit a path check packet; and check a forwarding operation performed by a switch(es) on the path.

[Mode 5]
In the control information management apparatus according to the mode 4, the control information management apparatus may be configured to instruct the control apparatus to transmit as the path check packet a packet that matches a match condition(s) in the outputted item(s) of control information.

[Mode 6]
The control information management apparatus according to any one of the modes 1 to 5 may serve as the control apparatus.

[Mode 7]
A control information presentation method may be the control information presentation method according to the above second aspect.

[Mode 8]
A program may be the program according to the above third aspect. The above modes 7 and 8 can be expanded in the same way as the mode 1 is expanded to the modes 2 to 6.

The disclosure of each of the above Patent Literature and Non-Patent Literatures is incorporated herein by reference thereto. Modifications and adjustments of the exemplary embodiments and the examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

10, 10B control apparatus
10A control information management apparatus
11 control information storage unit
12 search condition reception unit
13 control information search unit
14 search result output unit
15 path calculation unit
16 control information creation unit
17 switch control unit
18 test packet transmission instruction reception unit
20, 20a to 20d switch
21 control message transmission and reception unit
22 packet processing unit
23 control information storage unit
30a to 30c terminal
40 management terminal
41 input device
42 output device
100 control information
101 match conditions
102 action(s)

What is claimed is:

1. A control information management apparatus, comprising:
   a memory device storing at least one path in association with at least one item of a flow entry which includes match conditions and at least one action, the flow entry being set in at least one switch by a control apparatus for controlling the at least one switch; and
   a processor configured to execute program instructions to:
   receive path information indicating a path associated with the at east one item of flow entry;
   identify, based on the received path information, the at least one item of flow entry which is set on the at least one switch on the path; and output the identified control information, thereby facilitating a checking of flow entry that has been set for the path,
wherein the control apparatus and the at least one switch share an identifier for identifying the flow entry.

2. The control information management apparatus according to claim 1, wherein the memory device stores information about a terminal corresponding to a start point or an end point of the path in association with the at least one item of flow entry, and
wherein the item of flow entry is searched by specifying as a search condition the terminal corresponding to the start point or the end point of the path.

3. The control information management apparatus according to claim 1, wherein information used as a match condition of the match conditions in the flow entry set in the at least one switch is specified as a search condition.

4. The control information management apparatus according to claim 1, wherein the control information management apparatus is configured to:
instruct the control apparatus to transmit a path check packet; and
check a forwarding operation performed by the at least one switch on the path.

5. The control information management apparatus according to claim 4, wherein the control information management apparatus is further configured to instruct the control apparatus to transmit, as the path check packet, a packet that matches at least a match condition of the match conditions in the outputted identified flow entry.

6. The control information management apparatus according to claim 1, wherein the control information management apparatus serves as the control apparatus.

7. A control information presentation method, comprising:
by a control information management apparatus that includes a memory device storing at least one path in association with at least one item of flow entry which includes match conditions and at least one action, the flow entry being set in at least one switch by a control apparatus for controlling the at least one switch in a centralized manner;
receiving path information indicating a path associated with the at least one item of flow entry;
identifying, based on the received path information, the at least one item of flow entry which is set on the at least one switch on the path; and
outputting the identified flow entry to thereby facilitate a checking of flow entry that has been set for the path,
wherein the control apparatus and the at least one switch share an identifier for identifying the flow entry.

8. The control information presentation method according to claim 7, wherein the memory device stores information about a terminal corresponding to a start point or an end point of the path in association with the at least one item of flow entry, and
wherein the at least one item of flow entry is searched by receiving as a search condition the terminal corresponding to the start point or the end point of the path.

9. The control information presentation method according to claim 7, wherein the at least one item of flow entry is searched by receiving, as a search condition, information used as a match condition of the match conditions in the flow entry set in the at least one switch.

10. A non-transitory computer-readable recording medium storing a program that causes a computer, including a memory device that stores at least one path in association with at least one item of a flow entry which includes match conditions and at least one action, the flow entry being that is set in at least one switch by a control apparatus for controlling the at least one switch to execute:
receiving path information indicating a path associated with the at least one item of flow entry,
identifying, based on the received path information, the at least one item of flow entry which is set on the at least one switch on the path; and
outputting the identified flow entry to thereby facilitate a checking of flow entry that has been set for the path,
wherein the control apparatus and the at least one switch share an identifier for identifying the flow entry.

11. The control information management apparatus according to claim 1, wherein the identifier for identifying the at least one item of flow entry is generated and stored in the control apparatus and the at least one switch.

12. The control information presentation method according to claim 7, wherein the control information management apparatus is configured to instruct the control apparatus to transmit a path check packet.

13. The control information presentation method according to claim 12, wherein the control information management apparatus is further configured to check a forwarding operation performed by the at least one switch on the path.

14. The control information presentation method according to claim 13, wherein the control information management apparatus is further configured to instruct the control apparatus to transmit, as the path check packet, a packet that matches at least a match condition of the match conditions in the outputted identified flow entry.

15. The control information presentation method according to claim 7, further comprising generating and storing, in the control apparatus and the at least one switch, the identifier for identifying the at least one item of flow entry.

16. The non-transitory computer-readable recording medium according to claim 10, wherein the memory device stores information about a terminal corresponding to a start point or an end point of the path in association with the at least one item of flow entry, and
wherein the at least one item of flow entry is searched by receiving as a search condition the terminal corresponding to the start point or the end point of the path.

17. The non-transitory computer-readable recording medium according to claim 10, wherein the identifier for identifying the at least one item of flow entry is generated and stored in the control apparatus and the at least one switch.

18. The non-transitory computer-readable recording medium according to claim 10, wherein the control apparatus transmits a path check packet.

19. The non-transitory computer-readable recording medium according to claim 18, wherein the control apparatus checks a forwarding operation performed by the at least one switch on the path.

20. The non-transitory computer-readable recording medium according to claim 19, wherein the control apparatus transmits, as the path check packet, a packet that matches at least a match condition of the match conditions in the outputted identified flow entry.

21. A control information management apparatus, comprising:
a memory device storing at least one path in association with at least one item of a flow entry which includes match conditions and at least one action, the flow entry being set at least one switch by a control apparatus for controlling the at least one switch; and a processor configured to execute program instructions to:
   receive path information indicating a path associated with the at east one item of flow entry;
   identify, based on the received path information, the at least one item of flow entry which is set on the at least one switch on the path; and
   output the identified control information, thereby facilitating a checking of flow entry that has been set for the path,
wherein the processor identifies the flow entry by using VLAN ID included in the match conditions.

* * * * *